(12) United States Patent
Kim et al.

(10) Patent No.: US 10,074,855 B2
(45) Date of Patent: Sep. 11, 2018

(54) ELECTRODE FOR LITHIUM SECONDARY BATTERY AND LITHIUM SECONDARY BATTERY COMPRISING THE SAME

(71) Applicants: SAMSUNG SDI CO., LTD., Yongin-si, Gyeonggi-do (KR); SNU R&DB Foundation, Gwanak-gu, Seoul (KR)

(72) Inventors: Jae-Hyuk Kim, Yongin-si (KR);
Young-Ugk Kim, Yongin-si (KR);
Seung-Uk Kwon, Yongin-si (KR);
Soon-Sung Suh, Yongin-si (KR);
Hee-Young Chu, Yongin-si (KR);
Duk-Hyoung Yoon, Yongin-si (KR);
Chang-Ui Jeong, Yongin-si (KR);
Yo-Han Park, Yongin-si (KR);
Kyu-Hwan Oh, Seoul (KR);
Seoung-Bum Son, Seoul (KR);
Seul-Cham Kim, Seoul (KR);
Chan-Soon Kang, Seoul (KR)

(73) Assignees: Samsung SDI Co., Ltd., Yongin-si (KR); SNU R&DB Foundation, Seoul (KR)

( * ) Notice: Subject to any disclaimer, the term of this patent is extended or adjusted under 35 U.S.C. 154(b) by 332 days.

(21) Appl. No.: 14/288,274

(22) Filed: May 27, 2014

(65) Prior Publication Data
US 2015/0008374 A1   Jan. 8, 2015

(30) Foreign Application Priority Data

Jul. 5, 2013   (KR) ........................ 10-2013-0079028

(51) Int. Cl.
*H01B 1/04* (2006.01)
*H01M 4/38* (2006.01)
(Continued)

(52) U.S. Cl.
CPC ........... *H01M 4/386* (2013.01); *H01M 4/134* (2013.01); *H01M 4/62* (2013.01); *H01M 4/625* (2013.01); *H01M 10/052* (2013.01); *H01B 1/04* (2013.01)

(58) Field of Classification Search
CPC ....................................................... H01B 1/04
See application file for complete search history.

(56) References Cited

U.S. PATENT DOCUMENTS

| 5,474,861 | A | * | 12/1995 | Bito | ...................... | H01M 4/131 |
|---|---|---|---|---|---|---|
| | | | | | | 429/221 |
| 6,030,726 | A | * | 2/2000 | Takeuchi | .............. | H01M 4/133 |
| | | | | | | 429/231.8 |

(Continued)

FOREIGN PATENT DOCUMENTS

| JP | 6-302315 | 10/1994 |
|---|---|---|
| JP | 2006-164960 | 6/2006 |

(Continued)

OTHER PUBLICATIONS

KIPO Office Action dated Oct. 24, 2016, for corresponding Korean Patent Application No. 10-2013-0079028 (6 pages).

*Primary Examiner* — William Young
(74) *Attorney, Agent, or Firm* — Lewis Roca Rothgerber Christie LLP

(57) ABSTRACT

An electrode for a lithium secondary battery including a silicon-based alloy having an expansion coefficient of 10% or greater and an electrochemically inactive whisker, and a lithium secondary battery using the electrode for a lithium secondary battery.

19 Claims, 10 Drawing Sheets

(51) Int. Cl.
*H01M 4/62* (2006.01)
*H01M 4/134* (2010.01)
*H01M 10/052* (2010.01)

(56) References Cited

U.S. PATENT DOCUMENTS

| | | | |
|---|---|---|---|
| 2003/0008212 A1* | 1/2003 | Akashi | H01M 4/13 |
| | | | 429/231.9 |
| 2006/0102473 A1 | 5/2006 | Bito et al. | |
| 2009/0269677 A1* | 10/2009 | Hirose | H01M 4/134 |
| | | | 429/338 |
| 2013/0149594 A1 | 6/2013 | Jeong et al. | |
| 2014/0203207 A1* | 7/2014 | Jeon | H01M 4/386 |
| | | | 252/182.1 |

FOREIGN PATENT DOCUMENTS

| | | | |
|---|---|---|---|
| JP | 2008-103118 | * | 5/2008 |
| JP | 2013-125743 | A | 6/2013 |
| KR | 10-2002-0008702 | | 1/2002 |
| KR | 10-2005-0063655 | | 6/2005 |
| KR | 10-2009-0078591 | | 7/2009 |

* cited by examiner

ELECTRODE FOR LITHIUM SECONDARY BATTERY AND LITHIUM SECONDARY BATTERY COMPRISING THE SAME

CROSS-REFERENCE TO PATENT APPLICATION

This application claims priority to and the benefit of Korean Patent Application No. 10-2013-0079028, filed on Jul. 5, 2013, in the Korean Intellectual Property Office, the disclosure of which is incorporated herein in its entirety by reference.

BACKGROUND

1. Field

The present disclosure relates to an electrode for a lithium secondary battery and a lithium secondary battery including the same.

2. Description of the Related Art

Lithium secondary batteries, which have recently taken the spotlight as power sources for portable small electronic devices, use organic electrolyte solutions to provide discharge voltages that are at least twice as high as discharge voltages of batteries that use conventional alkaline aqueous solutions. As such, these lithium secondary batteries have relatively high energy densities.

In cathodes and anodes of the lithium secondary batteries, materials capable of inserting and removing (intercalating and deintercalating) lithium ions are used, where the organic electrolyte solutions or polymer electrolyte solutions are charged between the cathodes and the anodes to prepare the lithium secondary batteries, and electrical energy is generated due to oxidation reactions or reduction reactions during the insertion or removal of the lithium ions into or from the cathodes and the anodes.

In view of the above, the lithium secondary batteries have excellent battery characteristics such as high electromotive force and high energy densities, but batteries having longer lifespan characteristics are still in demand due to the needs of certain industries and thus, research into developing such batteries is constantly being pursued.

SUMMARY

An aspect of an embodiment of the present invention is directed toward an electrode for a lithium secondary battery having a reduced electrode plate expansion coefficient.

An aspect of an embodiment of the present invention is also directed toward a lithium secondary battery having an improved lifespan characteristic by using the electrode described above.

According to an embodiment of the present invention, an electrode for a lithium secondary battery includes a silicon-based alloy that has an expansion coefficient of 10% or greater and an electrochemically inactive whisker.

According to another embodiment of the present invention, a lithium secondary battery includes the electrode described above.

BRIEF DESCRIPTION OF THE DRAWINGS

The above and other features and advantages of the present invention will become more apparent by describing in detail example embodiments thereof with reference to the attached drawings in which.

DETAILED DESCRIPTION

Figure 1:
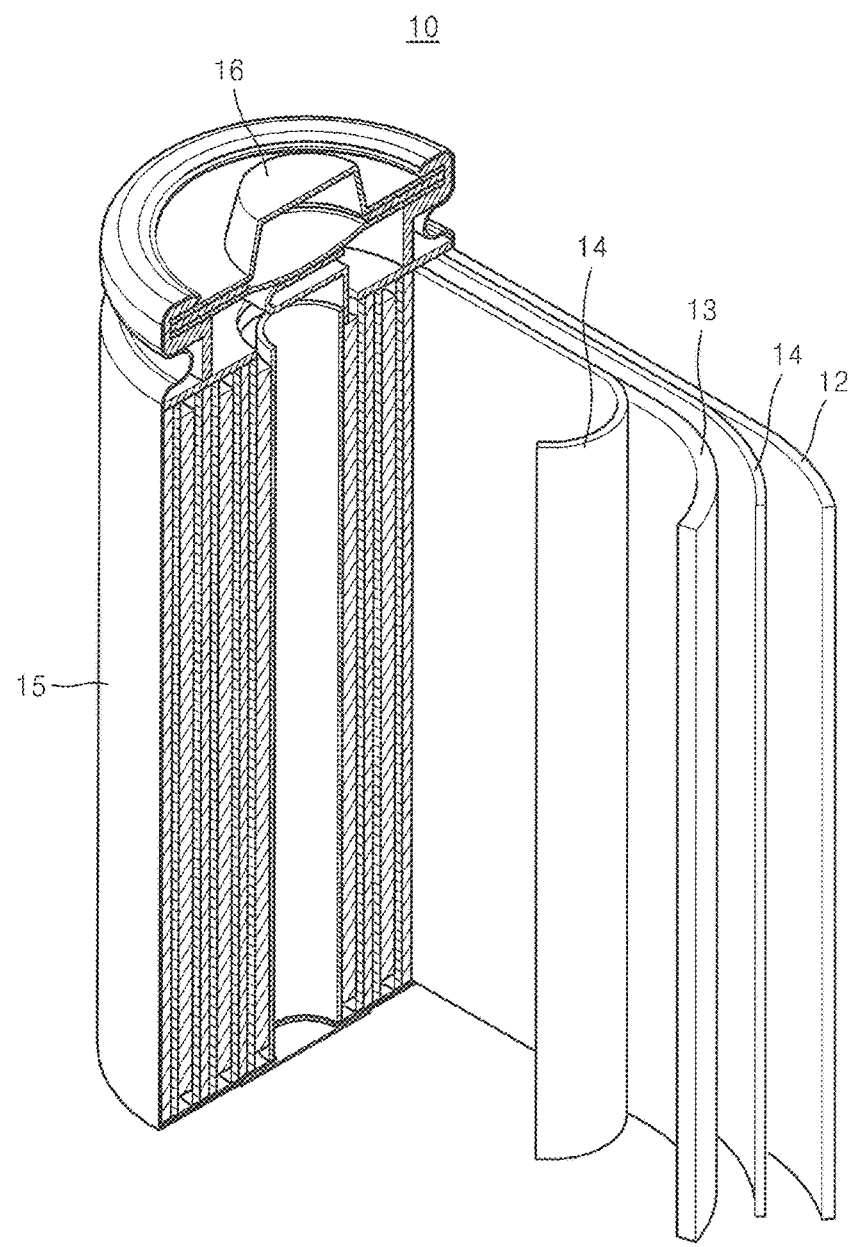
FIG. 1 is a schematic view illustrating a structure of a lithium secondary battery according to an embodiment.

Hereinafter, an electrode for a lithium secondary battery according to an embodiment and a lithium secondary battery including the electrode for a lithium secondary battery will be described in more detail. Expressions such as "at least one of," when preceding a list of elements, modify the entire list of elements and do not modify the individual elements of the list. Further, the use of "may" when describing embodiments of the present invention refers to "one or more embodiments of the present invention."

The lithium secondary battery includes a silicon-based alloy having an expansion coefficient of 10% or greater and an electrochemically inactive whisker.

A silicon-based alloy for an electrode active material is prepared by using a melt-spin process to limit the crystal growth of silicon and uniformly precipitate silicon in a matrix material. The silicon-based alloy prepared according to such a process has a form in which silicon particles are precipitated in the middle of a matrix structure, and the silicon-alloy-based matrix structure acts as a buffer layer that surrounds the silicon so that the silicon may withstand volume changes during a charge and discharge process. However, when an electrode is manufactured by using the silicon-based alloy, a high volume expansion of the silicon may occur during lithium intercalation, causing an expansion of the electrode plate, which in turn causes difficulties in obtaining a stable lifespan of a battery due to cracking of the active materials, secession of lithium ions from an electrode, and increased resistance due to an increase in a distance between the electrodes, and the like.

Thus, to solve these problems, inventors of the present inventive concept added an electrochemically inactive whisker to the silicon-based alloy having an expansion coefficient of 10% or greater, which inhibits formation of gaps between active material particles by forming (e.g., suitably forming) holes in the electrode when an expansion and a contraction of the silicon-based alloy occurs repeatedly, thereby effectively controlling expansion characteristics of the silicon based alloy after the lithium secondary battery has been charged. As a result, the electrode maintains a high volume capacity while having a low expansion coefficient and thus, a lithium secondary battery including the electrode has a stable lifespan characteristic while having a high capacity characteristic.

When the electrochemically inactive whisker is added to a silicon-based alloy having an expansion coefficient less than 10%, a further decrease in the expansion coefficient of an electrode plate is difficult to be achieved by using the silicon-based alloy. In this case, the decrease in the expansion coefficient is small, while a relative amount of the active material in the plate is low (when the electrochemically inactive whisker is added), and thus the negative electrode only shows a decrease in capacity per volume.

The expansion coefficient of the silicon-based alloy according to an embodiment is 10% or greater, for example about 15% to about 100%.

The expansion coefficient of the silicon-based alloy may be represented as a ratio of the total surface area of the silicon-based alloy at a cross-section of the electrode plate (including the silicon-based alloy) before and after charging, as represented by Formula 1.

Expansion coefficient of a silicon-based alloy=((total surface area of a silicon-based alloy in a cross-section of an electrode plate after charging)/(total surface area of a silicon-based alloy in a cross-section of an electrode plate before charging)−1)×100    Formula 1

The term "whisker" as used herein refers to any material that has a needle form, a rod form, and/or a fiber form, and has a set or predetermined length and thickness.

According to an embodiment, a length of the whisker is about 1 μm to about 5 μm, and a thickness of the whisker is about 10 nm to about 20 nm. When the length and the thickness of the whisker are in the above ranges, capacity characteristics of the lithium secondary battery are excellent without a decrease in a density of a negative electrode active material.

The whisker is, for example, a silicon carbide whisker, a silicon nitride whisker, a potassium titanate whisker, or an aluminum borate whisker; a nickel fiber, a copper fiber, or an iron fiber; or materials in which surfaces of a silicon carbide whisker, a silicon nitride whisker, a potassium titanate whisker, or an aluminum borate whisker are coated with one material selected from carbon, nickel, copper, or stainless steel.

When the surface of the silicon carbide whisker, the silicon nitride whisker, the potassium titanate whisker, or the aluminum borate whisker is coated with one material selected from carbon, nickel, copper, or stainless steel, an expansion and contraction of the silicon-based alloy are inhibited and thus, a current collector function may be additionally obtained while maintaining a structure of the silicone-based alloy containing electrode.

According to an embodiment, the silicon carbide (SiC) whisker is used as the whisker. The silicon carbide (SiC) whisker has a melting point of about 2730° C. and a hardness of 28.0 GPa, and thus, the silicon carbide whisker is a mechanically and chemically stable material, and has an apparent density of about 0.05 g/cc. Thus, the silicon carbide whisker is a material capable of forming (e.g., thoroughly forming) holes therearound. Accordingly, when the silicon carbide whisker is used, an electrode having well procured holes may be manufactured.

An electrode for a secondary battery according to an embodiment has holes on the active materials in the electrode to improve impregnation characteristics of an electrolyte solution. Also, due to the absence of volume expansion of the whisker, electrochemically inactive whisker particles may maintain an electrode structure during a charge and discharge to reduce lifespan degradation caused by the expansion.

An amount of the silicon in the silicon-based alloy is about 60 atomic % to about 72 atomic %. When the amount of the silicon in the silicon-based alloy is within the range above, the surface roughness of the silicon-based alloy containing electrode is excellent and the roughness deviation is small.

The silicon forming the silicon-based alloy may be a mixture of inactive silicon and active silicon. The active silicon may be directly related to the capacity of the silicon-based alloy (i.e., directly involved in the intercalation and deintercalation of lithium ions), and the inactive silicon has an inactive matrix structure (i.e., not directly involved in the intercalation and deintercalation of lithium ions) and plays a role of inhibiting volume expansion of the silicon-based alloy.

An amount of the active silicon may be in a range of about 40 atomic % to about 80 atomic % based on a total 100 atomic % of the amount of active silicon and the inactive silicon in the silicon-based alloy. In one embodiment, when the amount of the active silicon is within the range above, the volume expansion of the silicon-based alloy is effectively inhibited during a charge and discharge of the electrode using the silicon-based alloy, and the capacity characteristic of the electrode is excellent.

The silicon-based alloy has a structure in which silicon particles are precipitated in the middle of the silicon-alloy-based matrix. By having the structure and composition described above, when silicon particles expand during the charge and discharge, the silicon-alloy-based matrix surrounding the silicon particles effectively controls the volume change in the silicon particles. Accordingly, when the silicon-based alloy is used as the negative electrode active material, the expansion coefficient of the electrode (i.e., negative electrode) during the charge and discharge is reduced.

As a result of the decrease in the expansion coefficient of the electrode during the charge and discharge, problems arising due to the expansion of the electrode may be prevented beforehand. In other words, a phenomenon in which the destruction of the silicon-alloy-based matrix and the disintegration of the electrode structure cause the formation of an additional solid electrolyte interface (SEI), which in turn leads to an irreversible change in the capacity of the lithium secondary battery and thus a decrease in lifespan characteristics of the secondary battery may be prevented beforehand.

When the electrode that has been prepared to inhibit it from expansion after the charge and discharge is used, a lithium secondary battery having an improved initial efficiency, an improved capacity retention rate, and improved lifespan characteristics may be manufactured.

A plate density of the electrode according to an embodiment is about 1.0 g/cc to about 1.9 g/cc.

The term "plate density of the electrode" as used herein is calculated by dividing the weight of negative electrode components (i.e., active materials, conducting agents, binders, and the like) except (excluding the weight of) the current collector by a volume thereof.

In one embodiment, when the plate density of the electrode is within the range above, a lithium secondary battery having improved lifespan characteristics is manufactured.

The silicon-based alloy includes silicon, titanium (Ti), and at least one metal selected from nickel (Ni), iron (Fe), and manganese (Mn).

The silicon-based alloy may be represented as a silicon-M-A alloy, where M and A are selected differently, in one embodiment, M is Ti, and A is at least one selected from Ni and Fe.

In the silicon-M-A alloy, an amount of the silicon is about 60 atomic % to about 72 atomic %, an amount of M is about 7 atomic % to about 20 atomic %, and an amount of A is about 15 atomic % to about 20 atomic %.

According to an embodiment, the silicon-based alloy is $Si_{60}Ti_{20}Ni_{20}$, $Si_{65}Ti_{17.5}Ni_{17.5}$, $Si_{68}Ti_{16}Ni_{16}$, or $Si_{69}Ti_{11.5}Ni_{11.5}Fe_{8}$.

The silicon-based alloy may be prepared according to a general melt spinning process known to one of ordinary skill in the art.

The negative electrode active material includes the silicon-based alloy described above as a necessary component and may additionally use an additional negative electrode active material generally used in a lithium secondary battery other than the necessary component.

The additional negative electrode active material may be a second material that is capable of intercalating and deintercalating lithium ions selected from the group consisting of graphite, a carbon-based material (such as carbon), a lithium metal, an alloy thereof, a silicon-oxide-based material, and a mixture thereof.

According to an embodiment, a silicon-based alloy and a carbon-based material are used as the negative electrode active materials, and graphite is used as the carbon-based material.

As described above, when the carbon-based material is used together with the silicon-based alloy (which is an active material), an oxidation reaction of the silicone-based alloy may be inhibited and an SEI film may be effectively formed to form a stable film and improve electrical conductivity, thereby further improving charge and discharge characteristics of the lithium secondary battery.

In the lithium secondary battery, the carbon-based material may be used together with the silicon-based alloy. When the carbon-based material is used, for example, the carbon-based material may be coated on a surface of the silicon-based alloy (which is an active material).

An amount of the carbon-based material may be about 1 part by weight to about 97 parts by weight based on 100 parts by weight of a total weight of the carbon-based material and the silicon-based alloy, for example, about 5 parts by weight to about 20 parts by weight. Also, the amount of the carbon-based material is about 1 part by weight to about 20 parts by weight based on 100 parts by weight of a total weight of the electrode. The total amount of the electrode as used herein refers to a total weight of an electrode active material layer including the silicon-based alloy, the carbon-based material, the conducting agent, and the binder.

The carbon-based material may be crystalline carbon, amorphous carbon, or a mixture thereof. The crystalline carbon may be graphite such as natural graphite in a flat, flake, sphere, fiber, or an irregular form; or artificial graphite. The amorphous carbon may be a soft carbon (low temperature calcined carbon), a hard carbon, a mesophase pitch carbide, a calcined coke, and/or the like.

When a lubricating graphite having a flat form is used, the carbon-based material has an advantage in that it enables the expansion of the silicon-based active material to first occur in a horizontal direction. When a mixing weight ratio of the lubricating graphite having the flat form to the silicon-based alloy is about 5:1 to about 20:1, a plate expansion characteristic is excellent.

Hereinafter, a method of manufacturing a lithium secondary battery including the silicon-based alloy will be described in more detail.

The silicon-based alloy (which is an electrode active material), a whisker, a conducting agent, and a binder are mixed to form a composition for forming an electrode active material layer.

When preparing the composition, a solvent may be added.

When mixing, a milling machine may be used. The milling machine may be a pulverizer.

N-methyl pyrrolidone (NMP), pure water, or the like may be used as the solvent.

The amount of the solvent added is such that an amount of solid in the composition for forming the electrode active material layer is in a range of about 30 wt % to about 50 wt %. In one embodiment, when the amount of the solvent is in the range above, each component of the composition for forming the electrode active material layer has excellent dispersibility and thus, a process for forming the active material layer is easy.

The pulverizer may be a beads mill. When the beads mill is used as the pulverizer, the silicon-based alloy (which is an active material), the conducting agent, and the binder are pulverized to particles of a suitable size that are dispersed uniformly, and the particles are used to form an electrode having excellent surface roughness characteristics.

The composition for forming the electrode active material layer is coated on an electrode current collector to form a plate, which is then dried and pressed to manufacture an electrode.

The drying may be performed at a temperature of about 100° C. to about 150° C., for example, about 100° C. to about 110° C.

The electrode active material may be a negative electrode active material, and the electrode may be a negative electrode.

The negative electrode active material includes the above described silicon-based alloy as a necessary component, and may additionally include an additional negative electrode active material that is generally used in the lithium secondary battery other than the necessary component.

A material for the additional negative electrode active material may be a second material that is capable of intercalating and deintercalating lithium ions, the second material being selected from the group consisting of graphite, a carbon-based material (such as carbon), a lithium metal, an alloy thereof, a silicon-oxide-based material, and a mixture thereof.

According to an embodiment, the silicon-based alloy and the carbon-based material are used as the negative electrode active materials, and the lubricating graphite having a flat structure is used as the carbon-based material. When the carbon-based material is used, for example, the carbon-based material may be coated on the surface of the silicon-based alloy (which is an active material).

The binder is added in an amount of about 1 part by weight to about 10 parts by weight based on 100 parts by weight of a total weight of the negative electrode active material (e.g., the total weight of the silicon-based alloy and the carbon-based material). Examples of the binder include a vinylidene fluoride copolymer having at least one functional group selected from polyvinylidene fluoride, polyvinyl alcohol, carboxymethyl cellulose (CMC), starch, hydroxypropyl cellulose, regenerated cellulose, polyvinyl pyrrolidone, polyamide imide, polyethylene, polypropylene, ethylene-propylene-diene terpolymer (EPDM), sulfonated EPDM, styrene butadiene rubber, fluorine rubber, vinylidene fluoride copolymer having a least one functional group, the functional group being selected from the group consisting of a carboxyl group, an epoxy group, a hydroxyl group, and a carbonyl group.

When the amount of the binder is within the range above, bonding strength of the active material with respect to the current collector is further improved to manufacture an electrode and a battery having improved lifespan and stability.

The amount of the conducting agent used is about 1 part by weight to about 10 parts by weight based on 100 parts by weight of a total weight of the negative electrode active material. When the amount of the conducting agent is within the range above, conductivity characteristics of the finally obtained electrode is excellent.

The conducting agent is not particularly limited and may be any suitable material that has high conductivity but does not induce chemical changes to the battery, for example, the conducting agent may be graphite such as natural graphite or artificial graphite; a carbon-based material such as carbon black, acetylene black, ketjen black, channel black, furnace black, lamp black, or thermal black; a conductive fiber such as carbon fiber or metal fiber; a metal powder such as aluminum or nickel powder; a conductive whisker such as zinc oxide or potassium titanate; a conductive metal oxide such as titanium oxide; and/or a conductive material such as polyphenylene derivative.

The negative electrode current collector is generally formed to have a thickness of about 3 μm to about 500 μm. The negative electrode current collector is not particularly limited and may be any suitable material that has electrical conductivity but does not induce chemical changes to the battery, and examples of the negative electrode current collector include copper, stainless steel, aluminum, nickel, titanium, heat-treated carbon, copper, a material in which surfaces of copper or stainless steel are treated with carbon, nickel, titanium, silver, or the like, and aluminum-cadmium alloy. Also, a minute irregularity (as in the case of a positive electrode current collector to be discussed later) is formed on a surface of the negative electrode current collector to improve the bonding strength of the negative electrode active material, and the negative electrode current collector may be used in various forms such as a film, sheet, foil, net, porous body, foam, or pelt.

The electrode according to an embodiment has a porosity of about 20% to about 50%.

Hereinafter, a process of manufacturing a lithium secondary battery using the above described negative electrode will be described in more detail. For example, the lithium secondary battery according to an embodiment includes a positive electrode, a negative electrode, a lithium salt containing non-aqueous electrolyte, and a separator.

First, a positive electrode active material, a conducting agent, a binder, and a solvent are mixed together to prepare a composition for forming a positive electrode active material layer, and the composition may be coated and dried on a current collector to form a positive electrode.

The positive electrode active material used may be a lithium transition metal (e.g., a lithium transition metal oxide) generally used in a lithium secondary battery.

The lithium transition metal active material used may be at least one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$ ($0\leq y<1$), $LiCo_{1-y}Mn_yO_2$ ($0\leq y<1$), $LiNi_{1-y}Mn_yO_2$ ($0\leq y<1$), $LiMn_{2-z}Ni_zO_4$ ($0<z<2$), $LiMn_{2-z}Co_zO_4$ ($0<z<2$), $LiCoPO_4$, and $LiFePO_4$.

The binder and the conducting agent may be of the same kind and have the same amount as those used in manufacturing the above described negative electrode.

N-methylpyrrolidone, pure water, or the like may be used as the solvent.

An amount of the solvent used may be about 1 part by weight to about 500 parts by weight based on 100 parts by weight of the positive electrode active material. When the amount of the solvent is within the range above, a process for forming an active material layer is easy.

The positive current collector has a thickness of about 3 μm to about 500 μm, and may be any suitable material that has high conductivity but does not induce chemical changes to the battery, and the positive current collector used may be stainless steel, aluminum, nickel, titanium, heat treated carbon, and/or a material in which surfaces of aluminum or stainless steel are surface treated with carbon, nickel, titanium, silver, or the like. A minute irregularity is formed on a surface of the positive current collector to improve the bonding strength of a positive electrode active material, and the positive current collector may have various forms such as a film, sheet, foil, net, porous body, foam body, or pelt body.

A separator is disposed between the positive electrode manufactured according to the above-described process and the above described negative electrode.

Holes in the separator have a diameter of about 0.01 μm to about 10 μm, and a thickness of the separator is generally about 5 μm to about 300 μm. In greater detail, the separator used may be a sheet or pelt formed of an olefin-based polymer (such as polypropylene or polyethylene); or glass fiber. When a solid electrolyte such as a polymer is used as an electrolyte, the solid electrolyte may include the separator.

The lithium salt containing non-aqueous electrolyte may include a non-aqueous organic solvent and a lithium salt. A non-aqueous electrolyte solution, an organic solid electrolyte, an inorganic solid electrolyte, or the like may be used as the non-aqueous electrolyte.

As the non-aqueous organic solvent, N-methyl-2-pyrrolidinone, propylene carbonate, ethylene carbonate, butylene carbonate, dimethyl carbonate, diethyl carbonate, gamma-butyrolactone, 1,2-dimethoxyethane, 2-methyl tetrahydrofuran, N,N-dimethyl sulfoxide, 1,3-dioxolane, N,N-formamide, N,N-dimethyl formamide, acetonitrile, nitromethane, methyl formate, methyl acetate, phosphoric acid triester, trimethoxy methane, sulfolane, methyl sulfolane, 1,3-dimethyl-2-imidazolidinone, propylene carbonate, tetrahydrofuran, ether, methyl propionate, or ethyl propionate may be used, but the non-aqueous solvent is not limited thereto.

As the organic solid electrolyte, polyethylene, polyethylene oxide, polypropylene oxide, phosphoric acid ester polymer, polyvinyl alcohol, or polyvinylidene fluoride may be used, but the organic solid electrolyte is not limited thereto.

As the inorganic solid electrolyte, $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$ may be used, but the inorganic solid electrolyte is not limited thereto.

The lithium salt may be any suitable material that dissolves well in the non-aqueous organic solvent, and non-limiting examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, and $(CF_3SO_2)_2NLi$.

FIG. 1 is a schematic view illustrating a representative structure of a lithium battery according to an embodiment of the present inventive concept.

Referring to FIG. 1, the lithium secondary battery 10 is formed primarily by a positive electrode 13, a negative electrode 12, and a separator 14 disposed between the positive electrode 13 and the negative electrode 12, an electrolyte (impregnated in the positive electrode 13, the negative electrode 12, and the separator 14), a battery case 15, and a cap assembly 16 sealing the battery case 15.

The lithium secondary battery 10 may be formed by sequentially stacking the positive electrode 13, the separator 14, and the negative electrode 12 according to an embodiment of the present invention, and storing the stacked structure (in a rolled form) in the battery case 15.

Hereinafter, the lithium secondary battery will be described in greater detail with reference to the following Examples, but the lithium secondary battery is not limited to the following Examples.

EXAMPLE 1

Preparation of a Negative Electrode

A composition A of $Si_{69}Ti_{11.5}Ni_{11.5}Fe_8$ alloy was subjected to a melt spinning process to prepare a ribbon, which was then pulverized by using a ball mill to prepare a $Si_{69}Ti_{11.5}Ni_{11.5}Fe_8$ alloy.

During the ball mill pulverization in a container, a dry method with a zirconia ball having a diameter of 5 mm was used, and the pulverization was performed such that a weight ratio of the ball:powder was 50:1. When the ball and the $Si_{69}Ti_{11.5}Ni_{11.5}Fe_8$ alloy ribbon were charged, they were charged such that the volume thereof was about half the volume of the container. During the pulverization, a rotation speed was about 100 rpm. The pulverization was performed such that the average particle diameter d50 of the $Si_{69}Ti_{11.5}Ni_{11.5}Fe_8$ alloy powder after the pulverization was about 3 µm to about 8 µm.

The $Si_{69}Ti_{11.5}Ni_{11.5}Fe_8$ alloy obtained from the processes above, lubricating graphite (flat form), an SiC whisker (having a length of about 3 µm to about 10 µm and a thickness of about 100 nm), ketjen black as the conducting agent, and polyamide imide as the binder were mixed in a weight ratio of 70:15:5:2:8 to obtain a slurry. When preparing the slurry, pure water (deionized water), which is a solvent, was used in an amount such that a total solid content in a composition for forming a negative electrode active material layer was 48 wt %.

The slurry was coated on a copper (Cu) foil to form a thin plate having a thickness of about 20 µm to about 50 µm, which was then dried at a temperature of about 110° C. for 15 minutes or longer, and then dried in a vacuum atmosphere at a temperature of 350° C. for 1 hour to prepare a negative electrode.

EXAMPLE 2

Preparation of a Negative Electrode

A negative electrode was manufactured in the same manner as in Example 1, except that the mixing ratio of $Si_{69}Ti_{11.5}Ni_{11.5}Fe_8$ alloy-based active material:lubricating graphite (flat form):SiC whisker:conducting agent (KB):binder was changed to a weight ratio of 70:10:10:2:8 during the preparation of a slurry.

EXAMPLE 3

Preparation of a Negative Electrode

A negative electrode was manufactured in the same manner as in Example 1, except that the lubricating graphite was not used and the mixing ratio of $Si_{69}Ti_{11.5}Ni_{11.5}Fe_8$ alloy-based active material:SiC whisker:conducting agent (KB):binder was changed to a weight ratio of 70:20:2:8 during the preparation of a slurry.

EXAMPLE 4

Preparation of a Negative Electrode

A negative electrode was manufactured in the same manner as in Example 1, except that $Si_{68}Ti_{16}Ni_{16}$ alloy was used instead of $Si_{69}Ti_{11.5}Ni_{11.5}Fe_8$ alloy, and the mixing ratio of $Si_{68}Ti_{16}Ni_{16}$ alloy based active material:lubricating graphite (flat form):SiC whisker:conducting agent (KB):binder was changed to a weight ratio of 80:5:5:2:8.

EXAMPLE 5

Preparation of a Negative Electrode

A negative electrode was manufactured in the same manner as in Example 4, except that a lubricating graphite was not used and the mixing ratio of $Si_{68}Ti_{16}Ni_{16}$-alloy-based active material:SiC whisker:conducting agent (KB):binder was changed to a weight ratio of 80:10:2:8 during the preparation of a slurry.

EXAMPLE 6

Preparation of a Negative Electrode

A negative electrode was manufactured in the same manner as in Example 1, except that the mixing ratio of $Si_{69}Ti_{11.5}Ni_{11.5}Fe_8$ alloy-based active material:lubricating graphite (flat form):SiC whisker:conducting agent (KB):binder was changed to a weight ratio of 80:5:5:2:8 during the preparation of a slurry.

COMPARATIVE EXAMPLE 1

Preparation of a Negative Electrode

A negative electrode was manufactured in the same manner as in Example 1, except that the SiC whisker was not used and the mixing ratio of $Si_{69}Ti_{11.5}Ni_{11.5}Fe_8$ alloy-based active material:lubricating graphite (flat form):conducting agent (KB):binder was changed to a weight ratio of 70:20:2:8 during the preparation of a negative electrode slurry.

COMPARATIVE EXAMPLE 2

Preparation of a Negative Electrode

A negative electrode was manufactured in the same manner as in Example 5, except that the SiC whisker was not used, and $Si_{65}Ti_{17.5}Ni_{17.5}$ alloy was used instead of $Si_{69}Ti_{11.5}Ni_{11.5}Fe_8$ alloy during the preparation of a negative electrode slurry.

COMPARATIVE EXAMPLE 3

Preparation of a Negative Electrode

A negative electrode was manufactured in the same manner as in Comparative Example 2, except that $Si_{58}Al_{25.2}Fe_{16.8}$ alloy was used instead of the Si—Ti—Ni—Fe alloy.

COMPARATIVE EXAMPLE 4

Preparation of a Negative Electrode

A negative electrode was manufactured in the same manner as in Example 4, except that $Si_{58}Al_{25.2}Fe_{16.8}$ alloy was used instead of the Si—Ti—Ni—Fe-based alloy and the mixing ratio of silicon-alloy-based active material:lubricating graphite (flat form):SiC whisker:conducting agent (KB):binder was changed to a weight ratio of 80:5:5:2:8 during the preparation of a negative electrode slurry.

COMPARATIVE EXAMPLE 5

Preparation of a Negative Electrode

A negative electrode was manufactured in the same manner as in Example 5, except that $Si_{58}Al_{25.2}Fe_{16.8}$ alloy was used instead of the Si—Ti—Ni—Fe-based alloy and the mixing ratio of silicon-alloy-based active material:SiC whisker:conducting agent (KB):binder was changed to a weight ratio of 80:10:2:8 during the preparation of a negative electrode slurry.

MANUFACTURING EXAMPLE 1

Preparation of a Coin Cell

As a negative electrode, the negative electrode prepared according to Example 1 was used.

Lithium metals were used for the positive electrode and a counter electrode, polyethylene separator (Star 20) was used as a separator, a solution in which 1.5 M of $LiPF_6$ was dissolved in ethylene carbonate (EC), diethyl carbonate (DEC), and fluoroethylene carbonate (FEC) (a volume ratio of 5:70:25) was used as an electrolyte to manufacture a coin cell.

MANUFACTURING EXAMPLES 2-6

Preparation of a Coin Cell

A coin cell was manufactured in the same manner as in Manufacturing Example 1, except that the negative electrodes of Example 2-6 were used instead of the negative electrode of Example 1.

COMPARATIVE MANUFACTURING EXAMPLES 1-5

Preparation of a Coin Cell

A coin cell was manufactured in the same manner as in Manufacturing Example 1, except that the negative electrodes of Comparative Examples 1-5 were used instead of the negative electrode of Example 1.

EVALUATION EXAMPLE 1

Scanning Electron Microscope Analysis 1

1) Surfaces of the Negative Electrodes Prepared According to Examples 1 to 3, and Comparative Example 1

Surfaces of the negative electrodes prepared according to Examples 1 to 3, and Comparative Example 1 above were observed by using a scanning electron microscope, and the results are shown in FIGS. 2A to 2D, respectively. Here, the negative electrodes were in a state after coating and drying a composition for forming an active material layer on a current collector, but before pressure rolling the same.

Figure 2A:
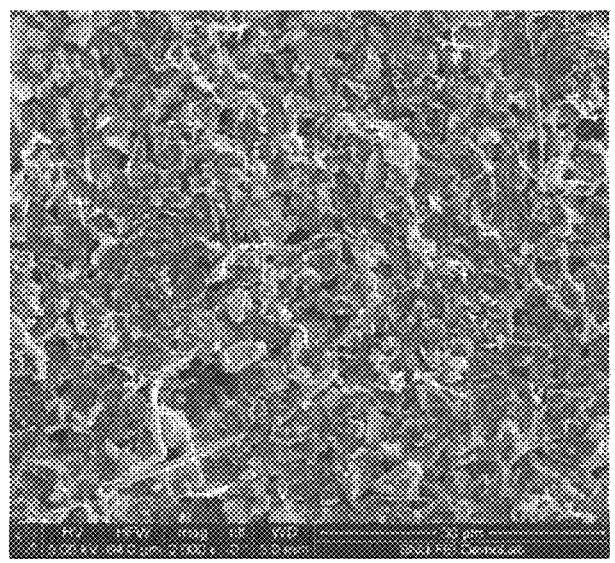
FIGS. 2A to 2D are scanning electron microscope (SEM) images of surfaces of the negative electrodes according to Examples 1 to 3, and Comparative Example 1, respectively.
Figure 2B:
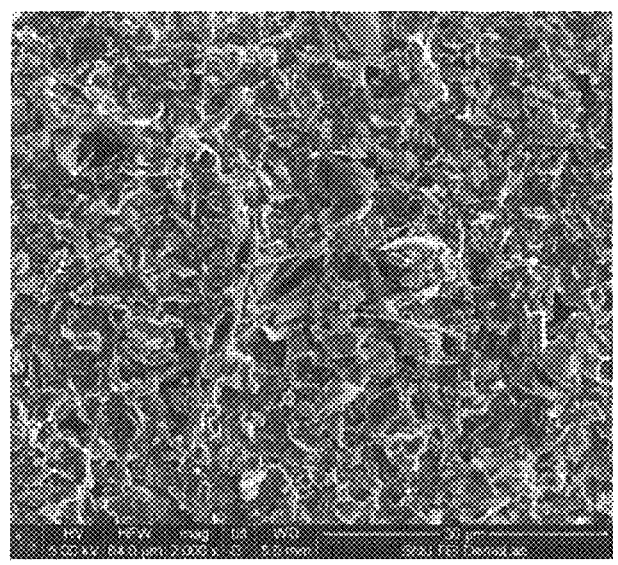
Figure 2C:
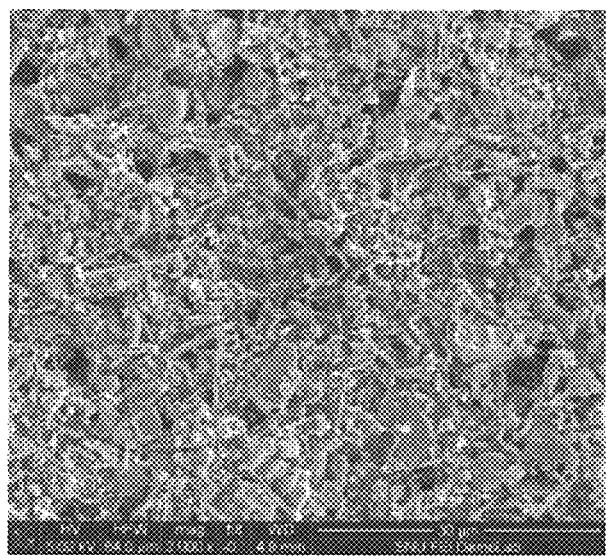
Figure 2D:
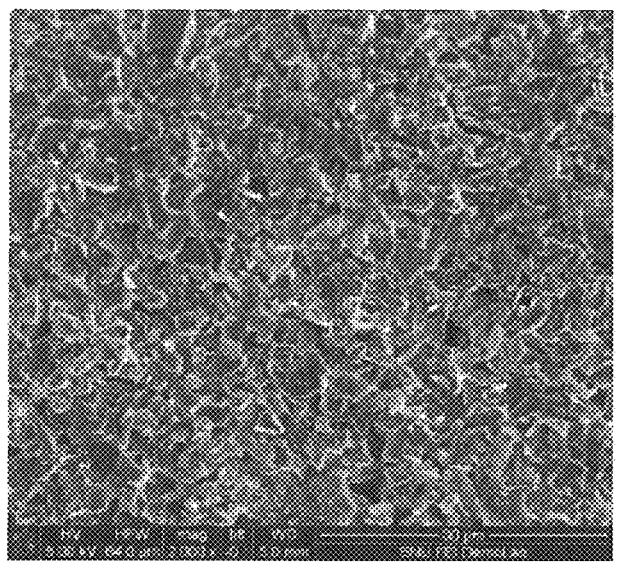

Referring to FIGS. 2A to 2C, it may be concluded that the negative electrodes prepared according to Examples 1 to 3 have whiskers on plates, unlike the negative electrode of Comparative Example 1 in FIG. 2D, and an increase in porosity.

2) Cross-Sections of Negative Electrodes Prepared According to Examples 1 to 3, 6, and Comparative Example 1

Cross-sections of the negative electrodes prepared according to Examples 1 to 3, 6, and Comparative Example 1 were observed by using a scanning electron microscope, and the results are shown in FIGS. 3A to 3E, respectively. Here, the negative electrodes were in a state after coating and drying a composition for forming an active material layer on a current collector, but before pressure rolling the same.

Figure 3A:
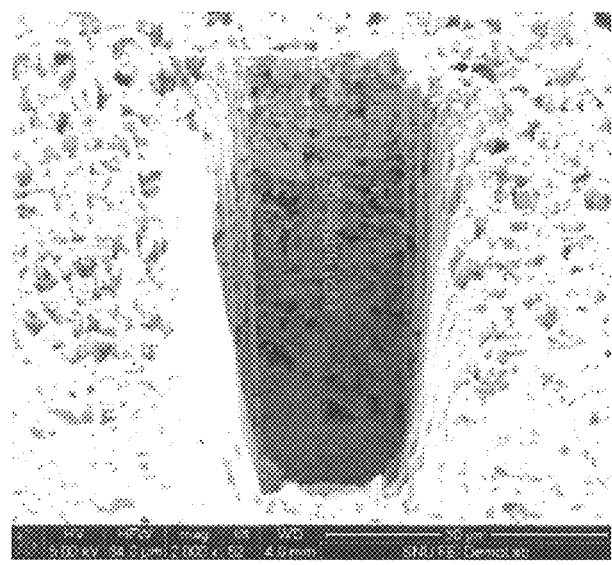
FIGS. 3A to 3E are SEM images of cross-sections of the negative electrodes according to Examples 1 to 3, and 6, and Comparative Example 1, respectively.
Figure 3B:
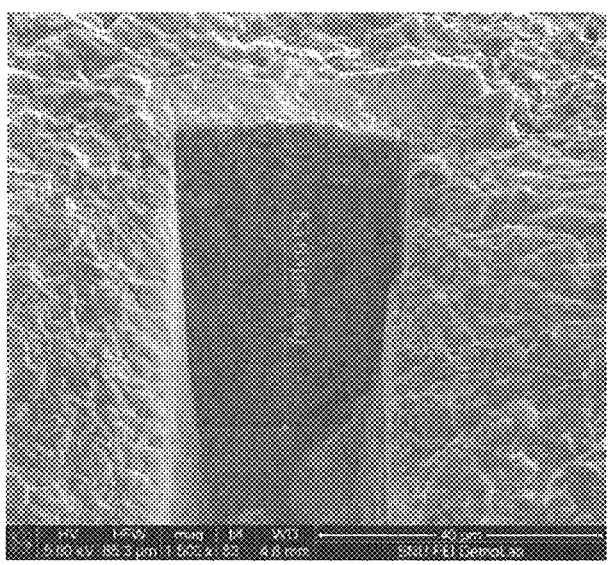
Figure 3C:
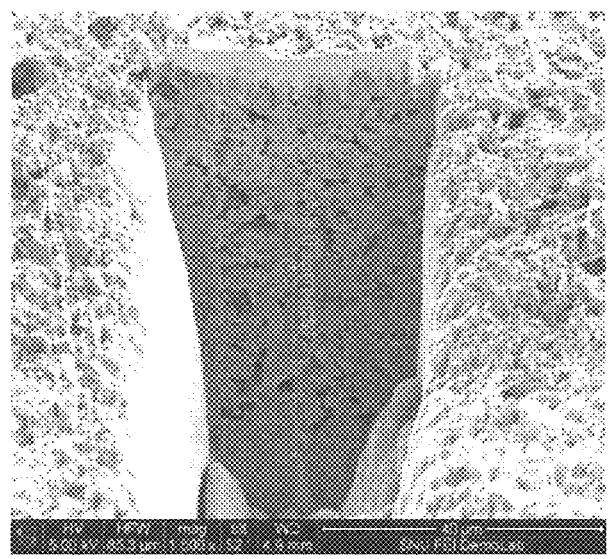
Figure 3D:
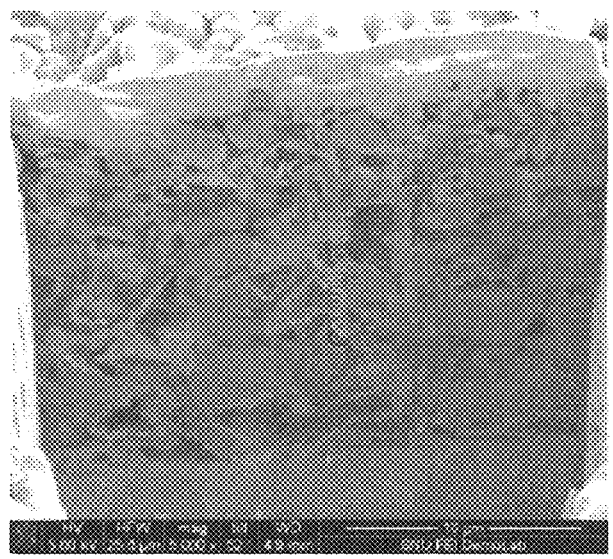
Figure 3E:
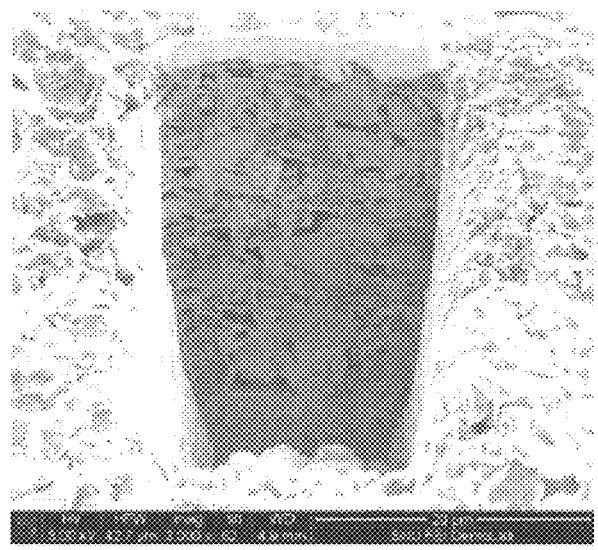
Figure 4A:
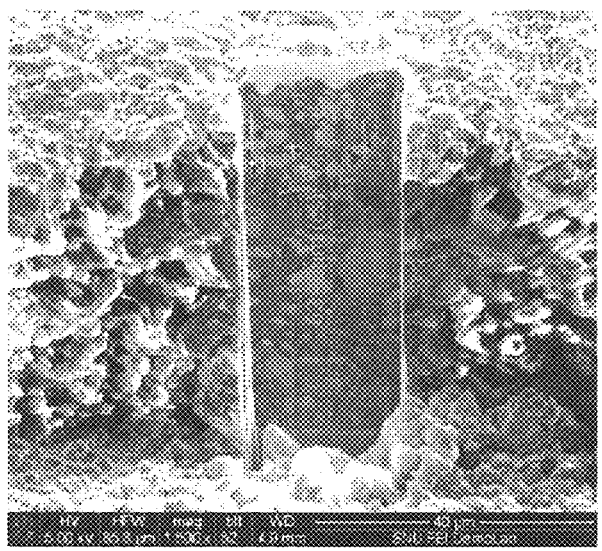
FIGS. 4A to 4E are SEM images of cross-sections of coin cells after an initial charging of coin cells including the negative electrodes according to Examples 1 to 3, and 6, and Comparative Example 1, respectively.
Figure 4B:
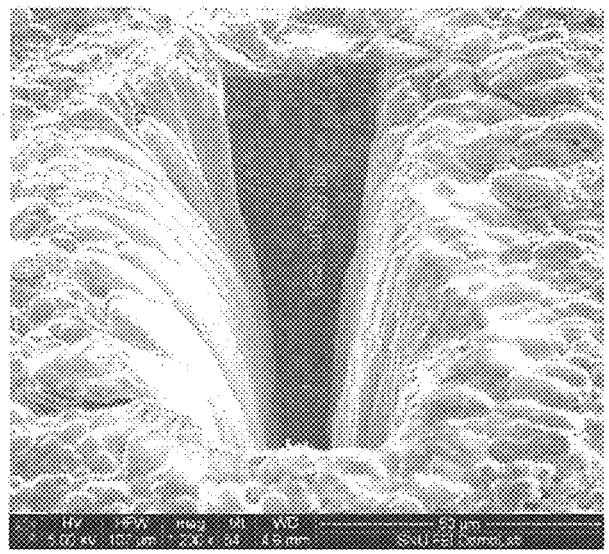
Figure 4C:
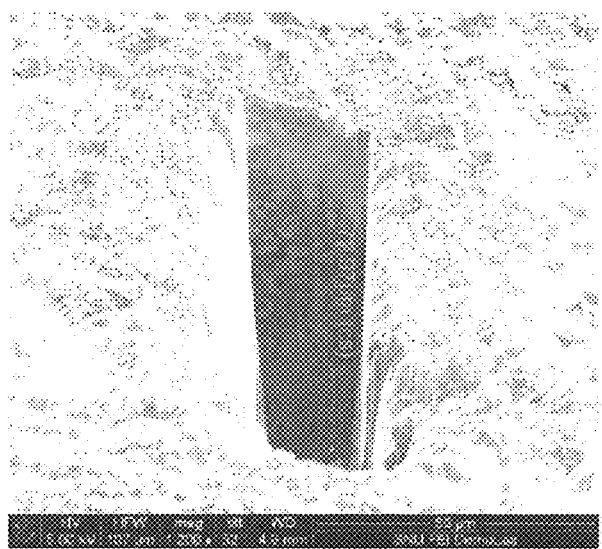
Figure 4D:
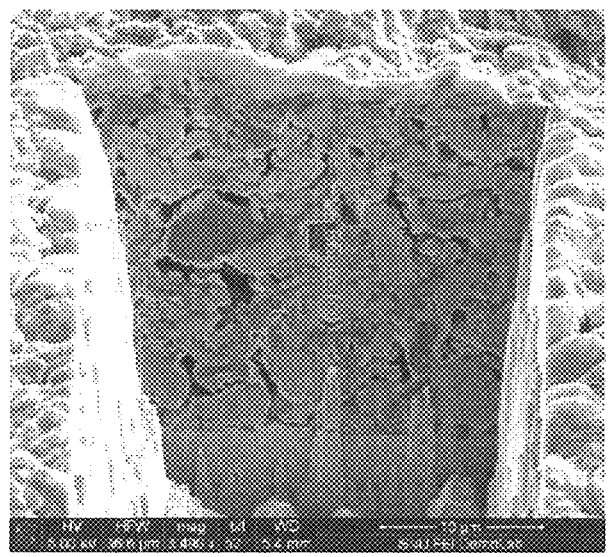
Figure 4E:

Referring to FIGS. 3A to 3D, all of the negative electrodes of Examples 1 to 3, and 6, and the negative electrode of Comparative Example 1 in FIG. 3E have internal holes thoroughly formed to a certain level (formed to a certain size including a certain length, width and depth), and in most cases of the Examples, it may be concluded that the holes are dispersed even more thoroughly than Comparative Examples 1.

EVALUATION EXAMPLE 2

Electron Microscope Analysis of a Negative Electrode after the Initial Charging of a Coin Cell 1) Cross-Sections of Negative Electrodes after Initial Charging of Coin Cells Prepared According to Manufacturing Examples 1 to 3, and 6, and Comparative Manufacturing Example 1

The coin cells prepared according to Manufacturing Examples 1 to 3, Manufacturing Example 6, and Comparative Manufacturing Example 1 were charged at 0.1 C and constant current to 0.01 V and then discharged at a constant voltage and to 0.01 C. Then, the resultant coin cells were disassembled in a dry room and observed. The cross-sections of the disassembled coin cells are shown in FIGS. 4A to 4E. After the charging, lithium insertions caused internal active materials to expand, thereby filling the holes, and the extent of filling differed across the coin cells.

Figure 5A:
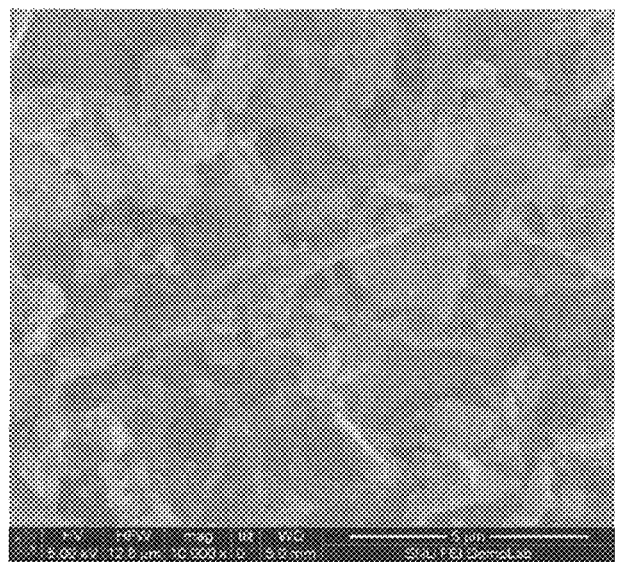
FIGS. 5A and 5B are SEM images of surfaces of the negative electrode according to Example 1 before (FIG. 5A) and after (FIG. 5B) an initial charging, respectively.
Figure 5B:
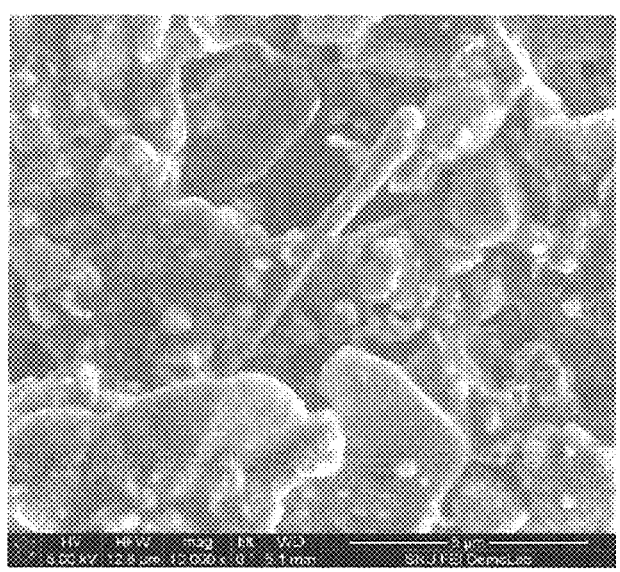

2) Surface of the Negative Electrode of a Coin Cell According to Manufacturing Example 1 Before and after Initial Charging A negative electrode surface of the coin cell prepared according to Manufacturing Example 1 is shown in FIGS. 5A and 5B. FIG. 5A is a magnified image of a state of the negative electrode surface prior to charging, which is used for comparing against FIG. 5B, which is a magnified image of a state of the negative electrode surface after charging. The image in FIG. 5A and the image in FIG. 5B were taken at the same magnification.

Referring to FIGS. 5A and 5B, it may be concluded that the SiC whisker is electrochemically stable since the SiC whisker remains in the negative electrode after charging while maintaining its structure as a whisker. However, in the case of a surrounding Si alloy or graphite lubricant, the insertion of lithium ions caused surface states of the negative electrode to be changed to a great extent (e.g., more small particles are observed in FIG. 5B than in FIG. 5A).

EVALUATION EXAMPLE 3

Plate Density of Negative Electrode

Plate densities of negative electrodes prepared according to Examples 1 to 6, and Comparative Examples 1 to 5 were measured, and the results are shown in Table 1 below.

Plate Density

Plate density was calculated by dividing the total weight of all the individual components of a negative electrode (active material, conducting agent, binder, and the like) excluding a current collector by a volume of all the components as a whole.

TABLE 1

|  | Plate density (g/cc) |
| --- | --- |
| Example 1 | 1.42 |
| Example 2 | 1.39 |
| Example 3 | 1.40 |
| Example 4 | 1.40 |
| Example 5 | 1.39 |
| Example 6 | 1.42 |
| Comparative Example 1 | 1.44 |
| Comparative Example 2 | 1.42 |
| Comparative Example 3 | 1.34 |
| Comparative Example 4 | 1.34 |
| Comparative Example 5 | 1.33 |

Referring to Table 1 above, the negative electrodes of Examples 1 to 6 do not show a great difference in plate densities compared to the negative electrodes of Comparative Examples 1 to 5.

EVALUATION EXAMPLE 4

Expansion Coefficient of Silicon-Based Alloy, Volume Capacity and Expansion Coefficient of Negative Electrode 1) Expansion Coefficient of Silicon-Based Alloy Expansion coefficient of the silicon-based alloys used in the preparation of the negative electrodes of Examples 1 to 6, and Comparative Examples 1 and 2 were calculated according to the following method, and the results are shown in Table 2 below.

The expansion coefficient of the silicon-based alloy may be represented as a proportion (i.e., ratio) based on a sum of all surface areas of the silicon-based alloy active material, and when the plate was cut, a cross-section thereof was analyzed by a focused ion beam (FIB). Here, when the cross-section was observed under a 3500× scanning electron microscope (SEM), a total sum of all surface areas of the silicon-based alloy included in 15 μm of a width and 15 μm of a length (e.g., in a 15 μM×15 μm area) of the plate was calculated, and then the expansion coefficient was calculated according to Formula 1 below.

Expansion coefficient of a silicon-based alloy={(total surface area of a silicon-based alloy in a cross-section of an electrode plate after charging)/(total surface area of a silicon-based alloy in a cross-section of an electrode plate before charging)−1}×100    Formula 1

TABLE 2

| Composition of silicon-based alloy | Expansion coefficient (%) |
| --- | --- |
| $Si_{69}Ti_{11.5}Ni_{11.5}Fe_8$ alloy | 15.45 |
| $Si_{65}Ti_{17.5}Ni_{17.5}$ alloy | 45.93 |
| $Si_{58}Al_{25.2}Fe_{16.8}$ alloy | 0.23 |

2) Volume Capacity and Expansion Coefficient of Negative Electrode

Measurement results of volume capacity, expansion coefficient, and volume capacity considering expansion of the negative electrodes of Examples 1 to 6 and Comparative Examples 1 and 2 are shown in Table 3 below. The volume capacity, expansion coefficient, and volume capacity considering expansion were evaluated according to the method below.

(1) Volume Capacity

Volume capacity was calculated according to Formula 2 below.

Volume capacity={(proportion(i.e., percentage) of negative electrode active materials in a composition for a negative electrode active material) *specific capacity (mAh/g)*plate density (g/cc)}    Formula 2

(2) Expansion Coefficient

The coin cells prepared according to Manufacturing Examples 1 to 6 and Comparative Manufacturing Examples 1 to 5 including the negative electrodes prepared according to Examples 1 to 6 and Comparative Examples 1 and 2 were set up such that when the coin cells were being charged at 0.1 C, the charging process began in a constant current (CC) mode, which then changed to a constant voltage (CV) mode that was cut off at 0.01 C. After the charging, the coin cells were disassembled in a dry room. In the disassembled coin cells, the increase in height of each of the negative electrode plates was measured by using a cross-section SEM to calculate an expansion coefficient of each negative electrode plate according to Formula 3 below.

Expansion coefficient of a negative electrode plate={(thickness of a negative electrode plate after charging−thickness of a substrate)/(initial thickness of an negative electrode plate before charging−thickness of a substrate)−1}×100    Formula 3

(3) Volume Capacity Considering Expansion

The volume capacity considering expansion was calculated by using the volume capacity and the expansion coefficient above, according to Formula 4 below.

Volume capacity considering expansion=volume capacity/(1+(expansion coefficient×0.01))    Formula 4

TABLE 3

|  | Specific capacity (@ 0.1 C, mAh/g) | Expansion coefficient (%) | Volume capacity considering expansion |
| --- | --- | --- | --- |
| Example 1 | 634.4 | 23.7 | 655.4 |
| Example 2 | 620.5 | 31.6 | 590.0 |
| Example 3 | 592.7 | 7.3 | 696.3 |
| Example 4 | 798.3 | 55.0 | 648.9 |
| Example 5 | 754.1 | 43.0 | 659.8 |
| Example 6 | 854.8 | 40.0 | 780.3 |
| Comparative Example 1 | 650.1 | 47.1 | 572.9 |
| Comparative Example 2 | 842.3 | 72.1 | 625.4 |

Referring to Table 3 above, the negative electrodes of Examples 1 to 5 each have a reduced expansion coefficient compared to the negative electrode of Comparative Example 2 and also, it may be concluded that the volume capacity considering expansion increased. Also, Example 6 is directly comparable to Comparative Example 2 which used a material that has a large specific capacity of the active material, and the negative electrode of Example 6 showed a reduction in the expansion coefficient and improved volume capacity considering expansion compared to that of Comparative Example 2.

In addition, the use of silicon-based alloy and SiC whisker in Examples 4 and 5 and Comparative Examples 4 to 5 was determined and is shown in Table 4 below, and measurement results of the specific capacity, expansion coefficient, and volume capacity considering expansion of Examples 4 and 5 and Comparative Examples 2 to 5 are shown in Table 5 below.

TABLE 4

|  | Composition of silicon-based alloy | Use of SiC whisker | Mixing ratio (weight ratio) of silicon-alloy-based active material:graphite lubricant:SiC whisker:conducting agent (KB):binder |
|---|---|---|---|
| Example 4 | $Si_{68}Ti_{16}Ni_{16}$ alloy | ◯ | 80:5:5:2:8 |
| Example 5 | $Si_{68}Ti_{16}Ni_{16}$ alloy | ◯ | 80:0:10:2:8 |
| Comparative Example 2 | $Si_{65}Ti_{17.5}Ni_{17.5}$ alloy | X | 80:10:0:2:8 |
| Comparative Example 3 | $Si_{58}Al_{25.2}Fe_{16.8}$ alloy | X | 80:10:0:2:8 |
| Comparative Example 4 | $Si_{58}Al_{25.2}Fe_{16.8}$ alloy | ◯ | 80:5:5:2:8 |
| Comparative Example 5 | $Si_{58}Al_{25.2}Fe_{16.8}$ alloy | ◯ | 80:0:10:2:8 |

TABLE 5

|  | Specific capacity (@ 0.1 C, mAh/g) | Expansion coefficient of the negative electrode (%) | Rate of change in expansion coefficient of the negative electrode | Volume capacity considering expansion (mAh/CC) | Increase in volume capacity considering expansion |
|---|---|---|---|---|---|
| Example 4 | 798.3 | 55.0 | 23.72 | 648.9 | + |
| Example 5 | 754.1 | 43.0 | 40.36 | 659.8 | + |
| Comparative Example 2 | 842.3 | 72.1 | Standard | 625.4 | Standard |
| Comparative Example 3 | 889.1 | 30.6 | Standard | 820.8 | Standard |
| Comparative Example 4 | 859.3 | 30.1 | −1.63% | 796.8 | − |
| Comparative Example 5 | 773.0 | 36.6 | 19.61% | 677.6 | − |

In Table 5 above, the rate of change in the expansion coefficient of the negative electrodes prepared in Examples 4 and 5 are calculated using Formula 5 below based on the expansion coefficients of Comparative Example 2.

Rate of change in an expansion coefficient={(expansion coefficient of the negative electrode of Comparative Example 2−expansion coefficient of the negative electrode of Example 4 or 5)/(expansion coefficient of the negative electrode of Comparative Example 2)}×100     Formula 5

In Table 5 above, changes (rate of change) in the expansion coefficients of the negative electrodes prepared in Comparative Examples 4 and 5 are calculated by using Formula 6 below based on the expansion coefficient of the negative electrode prepared in Comparative Example 3.

Rate of change of expansion coefficient={(expansion coefficient of the negative electrode of Comparative Example 4 or 5−expansion coefficient of the negative electrode of Comparative Example 3)/(expansion coefficient of the negative electrode of Comparative Example 3)}×100     Formula 6

As shown in Table 5 above, the cases of Comparative Example 4 and Comparative Example 3 not only showed a smaller improvement in the expansion coefficients compared to that of Examples 5 and 4 of Table 4, but also showed a decrease in volume capacities considering expansion. Also, in the case of Comparative Example 5, an amount of SiC increased compared to the case of Comparative Example 4, while the expansion coefficient increased and volume capacity considering expansion decreased compared to Comparative Example 4.

From the results described above, when the expansion coefficient of the silicon-based alloy is less than 10% (Comparative Examples 3 to 5) it may be concluded that improvement in expansion coefficient is small or non-existent and the volume capacity considering expansion deteriorates compared with the cases of Examples 4 and 5.

EVALUATION EXAMPLE 5

Cycle Characteristic and Capacity Retention Rate

Regarding the coin cells manufactured according to Manufacturing Examples 1, 2, and 6, and Comparative Manufacturing Example 1, a charge and discharge is performed once at 0.1 C first to perform formation, then initial charge and discharge characteristics are observed through a charge and discharge once at 0.2 C, and then a charge and discharge at 1 C was repeated 40 times to observe cycle characteristics. A charging process was set to begin at a cut-off voltage of 0.01 V in a constant current (CC) mode, which then changed into a constant voltage (CV) mode to be cut-off at 0.01 C, and a discharging process was set to be cut-off at 1.5 V in a constant current (CC) mode.

Figure 6:
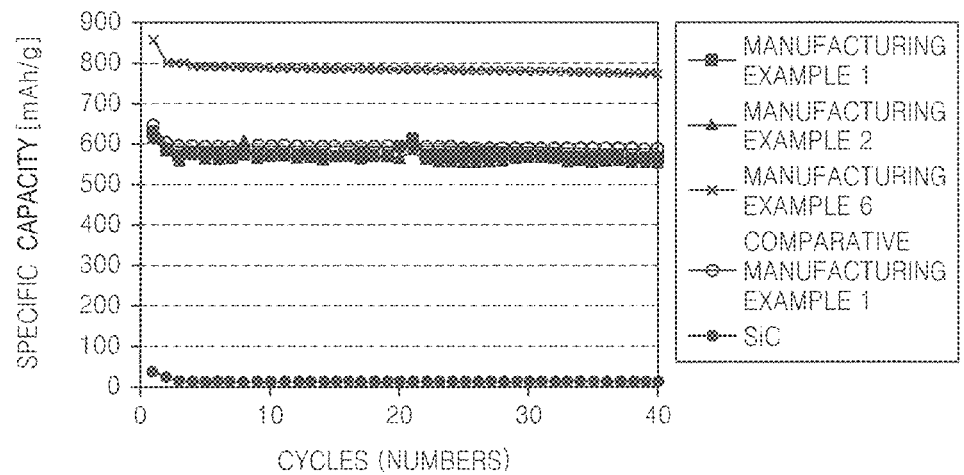
FIG. 6 shows specific capacity curve of the coin cells according to Manufacturing Examples 1, 2, and 6, and Comparative Manufacturing Example 1.
Figure 7:
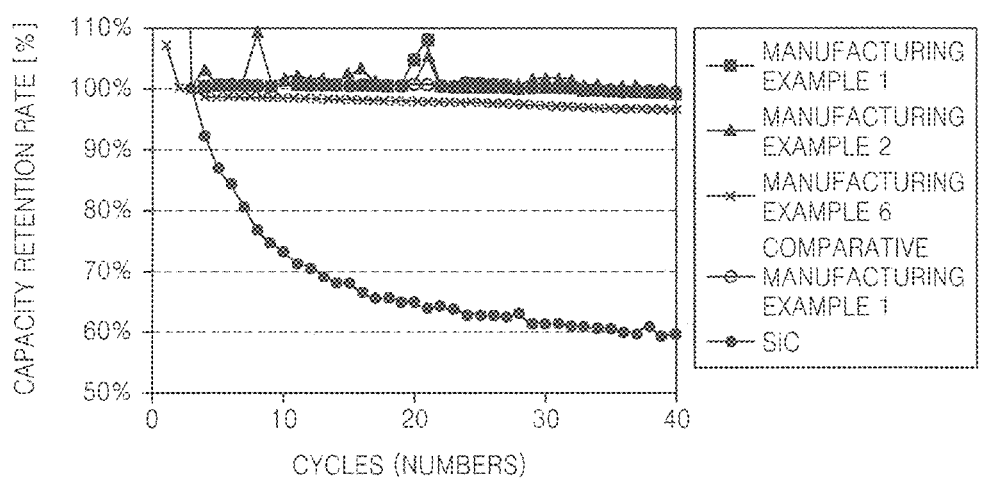
FIG. 7 shows changes in capacity retention rates of the coin cells according to Manufacturing Examples 1, 2, and 6, and Comparative Manufacturing Example 1.

Changes in specific capacity according to the cycle of the coin cells manufactured according to Manufacturing Examples 1, 2, and 6, and Comparative Manufacturing Example 1, are shown in FIG. 6, and changes in discharge capacity according to the cycle were evaluated and are shown in FIG. 7. For comparative purposes, the case in which SiC was used is also shown in FIGS. 6 and 7.

Also, in the coin cells manufactured according to Manufacturing Examples 1, 2, and 6, and Comparative Manufacturing Example 1, a capacity retention rate at a $40^{th}$ cycle is represented as Formula 7 below, and the results are as shown in FIG. 7.

Capacity retention rate at $40^{th}$ cycle [%]=[discharge capacity at $40^{th}$ cycle/discharge capacity at $1^{st}$ cycle]×100     Formula 7

Referring to FIG. 6, the coin cell of Manufacturing Examples 1 and 2 showed an excellent specific capacity compared to that of Comparative Manufacturing Example 1, and the specific capacity of the coin cell of Manufacturing Examples 1 and 2 showed almost equal levels of specific capacity as in Comparative Manufacturing Example 1.

Referring to FIGS. 6 and 7, the coin cell of Manufacturing Examples 1 and 2 showed capacity retention rates that are almost equal to the excellent capacity retention rate of the coin cell of Comparative Manufacturing Example 1. Also, the coin cell of Manufacturing Example 6 has much greater specific capacity than the coin cell of Comparative Manufacturing Example 1 while having a low expansion coefficient (see Table 3) without substantial decrease in cell characteristics.

An electrode for a lithium secondary battery according to an embodiment has a reduced electrode plate expansion coefficient to maintain a high volume capacity while having a low expansion coefficient and thus, a high capacity lithium secondary battery having a stable lifespan characteristic may be manufactured.

While the present invention has been particularly shown and described with reference to exemplary embodiments thereof, it will be understood by those of ordinary skill in the art that various changes in form and details may be made therein without departing from the spirit and scope of the present invention as defined by the following claims, and equivalents thereof.

What is claimed is:

1. An electrode for a lithium secondary battery, the electrode comprising:
   an active material layer comprising:
      a silicon-based alloy having an expansion coefficient of 10% or greater; and
      5 weight % to 20 weight % of an electrochemically inactive whisker based on a total weight of the active material layer,
   wherein the electrochemically inactive whisker is a silicon carbide whisker, a silicon nitride whisker, a potassium titanate whisker, or an aluminum borate whisker; or a silicon carbide whisker, a silicon nitride whisker, a potassium titanate whisker, or an aluminum borate whisker, each having a surface coated with carbon, nickel, copper, or stainless steel, and
   a thickness of the electrochemically inactive whisker is about 10 nm to about 20 nm.

2. The electrode of claim 1, wherein the active material layer further comprises a carbon-based material.

3. The electrode of claim 2, wherein an amount of the carbon-based material is about 1 part by weight to about 97 parts by weight based on 100 parts by weight of a total weight of the silicon-based alloy and the carbon-based material.

4. The electrode of claim 1, wherein the expansion coefficient of the silicon-based alloy is about 15% to about 100%.

5. The electrode of claim 1, wherein the silicon-based alloy comprises:
   silicon;
   titanium; and
   at least one metal selected from nickel (Ni), iron (Fe), and manganese (Mn).

6. The electrode of claim 1, wherein the silicon-based alloy is represented as silicon-M-A-alloy, M is titanium (Ti), and A is at least one selected from nickel (Ni) and iron (Fe).

7. The electrode of claim 6, wherein in the silicon-M-A-alloy, an amount of silicon is about 60 atomic % to about 72 atomic %, an amount of M is about 7 atomic % to about 20 atomic %, and an amount of A is about 15 atomic % to about 20 atomic %.

8. The electrode of claim 1, wherein the silicon-based alloy is $Si_{60}Ti_{20}Ni_{20}$, $Si_{65}Ti_{17.5}Ni_{17.5}$, $Si_{68}Ti_{16}Ni_{16}$, or $Si_{69}Ti_{11.5}Ni_{11.5}Fe_8$.

9. The electrode of claim 1, wherein the electrode is a negative electrode.

10. A lithium secondary battery comprising:
    an electrode for a lithium secondary battery, the electrode comprising:
       an active material layer comprising:
          a silicon-based alloy having an expansion coefficient of 10% or greater; and
          5 weight % to 20 weight % of an electrochemically inactive whisker based on a total weight of the active material layer,
       wherein the electrochemically inactive whisker is a silicon carbide whisker, a silicon nitride whisker, a potassium titanate whisker, or an aluminum borate whisker; or a silicon carbide whisker, a silicon nitride whisker, a potassium titanate whisker, or an aluminum borate whisker, each having a surface coated with carbon, nickel, copper, or stainless steel, and
       a thickness of the electrochemically inactive whisker is about 10 nm to about 20 nm.

11. The lithium secondary battery of claim 10, wherein the active material layer further comprises a carbon-based material.

12. The lithium secondary battery of claim 11, wherein an amount of the carbon-based material is about 1 part by weight to about 97 parts by weight based on a total of 100 parts by weight of the silicon-based alloy and the carbon-based material.

13. The lithium secondary battery of claim 10, wherein the expansion coefficient of the silicon-based alloy is about 15% to about 100%.

14. The lithium secondary battery of claim 10, wherein the silicon-based alloy comprises:
    silicon;
    titanium; and
    at least one metal selected from nickel (Ni), iron (Fe), and manganese (Mn).

15. The lithium secondary battery of claim 10, wherein the silicon-based alloy is represented as a silicon-M-A-alloy, M is titanium (Ti), and A is at least one selected from nickel (Ni) and iron (Fe).

16. The lithium secondary battery of claim 15, wherein in the silicon-M-A-alloy, an amount of silicon is about 60 atomic % to about 72 atomic %, an amount of M is about 7 atomic % to about 20 atomic %, and an amount of A is about 15 atomic % to about 20 atomic %.

17. The lithium secondary battery of claim 10, wherein the silicon-based alloy is $Si_{60}Ti_{20}Ni_{20}$, $Si_{65}Ti_{17.5}Ni_{17.5}$, $Si_{68}Ti_{16}Ni_{16}$, or $Si_{69}Ti_{11.5}Ni_{11.5}Fe_8$.

18. The lithium secondary battery of claim 10, wherein the electrode is a negative electrode.

19. The electrode of claim 1, wherein the electrochemically inactive whisker is a silicon nitride whisker; an aluminum borate whisker; or a silicon carbide whisker, a silicon nitride whisker, a potassium titanate whisker, or an aluminum borate whisker, each having a surface coated with carbon, nickel, copper, or stainless steel.

* * * * *